United States Patent
Li et al.

(10) Patent No.: US 11,602,957 B2
(45) Date of Patent: Mar. 14, 2023

(54) TIRE WITH NEW SIDEWALL PATTERN, AND TIRE MOLD

(71) Applicant: Himile Mechanical Science and Technology (Shandong) Co., Ltd., Shandong (CN)

(72) Inventors: Chenglin Li, Shandong (CN); Peng Zhao, Shandong (CN); Ping Du, Shandong (CN); Wei Zhang, Shandong (CN); Gongyun Zhang, Shandong (CN); Jiqiang Shan, Shandong (CN); Yaoyu Gong, Shandong (CN); Qinfeng Wang, Shandong (CN); Riwen Sun, Shandong (CN); Zhilan Liu, Shandong (CN); Xiliang Shen, Shandong (CN)

(73) Assignee: Himile Mechanical Science and Technology (Shandong) Co., Ltd., Shandong (CN)

( * ) Notice: Subject to any disclaimer, the term of this patent is extended or adjusted under 35 U.S.C. 154(b) by 25 days.

(21) Appl. No.: 16/981,102

(22) PCT Filed: Dec. 21, 2018

(86) PCT No.: PCT/CN2018/122600
§ 371 (c)(1),
(2) Date: Sep. 15, 2020

(87) PCT Pub. No.: WO2019/174347
PCT Pub. Date: Sep. 19, 2019

(65) Prior Publication Data
US 2021/0107320 A1    Apr. 15, 2021

(30) Foreign Application Priority Data
Mar. 16, 2018 (CN) .......................... 201810222463.0

(51) Int. Cl.
*B60C 13/00* (2006.01)
*B29D 30/06* (2006.01)
(Continued)

(52) U.S. Cl.
CPC ........ *B60C 13/001* (2013.01); *B29D 30/0606* (2013.01); *B29D 30/72* (2013.01);
(Continued)

(58) Field of Classification Search
CPC ....... B60C 13/00; B60C 13/001; B60C 13/02; B60C 13/023; B29D 2030/726; B29D 2030/728
(Continued)

(56) References Cited

U.S. PATENT DOCUMENTS

2010/0170598 A1  7/2010 Hsieh
2018/0126795 A1* 5/2018 Iwabuchi ................ B60C 13/02
2019/0047331 A1* 2/2019 Iwabuchi ............. B29C 33/424

FOREIGN PATENT DOCUMENTS

CN    1167048 A    12/1997
CN    107107679 A   8/2017
(Continued)

OTHER PUBLICATIONS

Iwabuchi S, JP-2017136959-A, machine translation. (Year: 2017).*
(Continued)

*Primary Examiner* — Robert C Dye
*Assistant Examiner* — Sedef E Paquette
(74) *Attorney, Agent, or Firm* — Medler Ferro Woodhouse & Mills PLLC

(57) ABSTRACT

Provided are a tire with new sidewall pattern and a tire mold, which belongs to the technical field of tire, the tire includes a tire body, a sidewall of the tire body has a labeling region, in which multiple pattern units are provided; the pattern units are provided to protrude from the tire body, the pattern
(Continued)

unit includes a curved portion having a curved segment and extension ends provided at both ends of the curved segment. The tire mold is used for manufacturing the tire. The tire has better visual performance and mechanical performance.

22 Claims, 8 Drawing Sheets

(51) Int. Cl.
   *B29D 30/72* (2006.01)
   *B60C 13/02* (2006.01)
(52) U.S. Cl.
   CPC ...... *B60C 13/02* (2013.01); *B29D 2030/0612* (2013.01); *B29D 2030/0616* (2013.01); *B29D 2030/726* (2013.01)
(58) Field of Classification Search
   USPC ............................................. 152/523
   See application file for complete search history.

(56) References Cited

FOREIGN PATENT DOCUMENTS

| | | | |
|---|---|---|---|
| CN | 107531109 A | | 1/2018 |
| CN | 107614292 A | | 1/2018 |
| CN | 108407348 A | | 8/2018 |
| CN | 208133654 U | | 11/2018 |
| JP | 2016215706 A | | 12/2016 |
| JP | 2017001438 A | * | 1/2017 |
| JP | 2017001438 A | | 1/2017 |
| JP | 2017132386 A | | 8/2017 |
| JP | 2017136959 A | * | 8/2017 |

OTHER PUBLICATIONS

Iwabuchi S, JP-2017001438-A, machine translation. (Year: 2017).*
International Search Report dated Mar. 27, 2019, in International Appl. No. PCT/CN2018/122600.

* cited by examiner

B – B

C-C

D-D

TIRE WITH NEW SIDEWALL PATTERN, AND TIRE MOLD

FIELD OF THE DISCLOSURE

The present application relates to a field of tire, and specifically relates to a tire with novel sidewall pattern and a tire mold.

BACKGROUND

Sidewall(s) of a tire is/are provided with a lot of marks such as patterns, letters and the like. These marks are made by means of a tire mold, on surfaces of which groove structures are provided, and corresponding stripe structures are formed on the surfaces of the tire by vulcanization. A vulcanization mold for the tire is generally made of metal, the surfaces of the tire mold are often machined to be relative smooth, i.e. with higher smoothness. However, the outer surface of the tire obtained by this way, which is of black, is smooth, and such a smooth outer surface will reflect light rays, resulting in a deteriorated appearance of the surface of the tire.

SUMMARY

The present application proposes a tire with a novel sidewall pattern, which tends to solve the above mentioned problem existed in the tire with sidewall patterns of the prior art.

The present application proposes a tire mold, which tends to solve the above mentioned problem existed in the tire mold of prior art.

The present application is realized as follows:

a tire with novel sidewall pattern including a tire body, a sidewall of the tire body has a labeling region, in which multiple pattern units are provided;

the pattern units are provided so as to protrude out from the tire body, the pattern units includes a curved portion having a curved section, and the curved portion further includes extension ends provided at both ends of the curved section.

In a preferred embodiment, the curved section is of arc shape and/or of multi-line segments, the extension ends are of arc shape and/or of multi-line segments;

a curvature radius of the extension ends and/or a circumscribed arc thereof is less than that of the curved section and/or a circumscribed arc thereof; for example, a curvature radius of the circumscribed arc of the extension ends in the form of multi-line segments or a curvature radius of the extension ends in the form of arc shape is less than that of the circumscribed arc of the curved section in the form of multi-line segments or that of the curved section in the form of arc shape;

preferably, a curving direction of the extension end is different from the curving direction of the curved section;

preferably, a length of the curved portion is 1-6 mm, preferably 2-4 mm, more preferably 3 mm;

preferably, each pattern unit is bilateral symmetry, and is periodically repeated; or each pattern unit is bilateral asymmetry;

preferably, an angle formed by connecting end points of multiple line segments of the curved portion is 90°-180°.

In a preferred embodiment, the extension ends of the multiple curved portions is connected so as to form a curved portion chain, and multiple curved portion chains are arranged in an interlaced way;

Two adjacent curved portion chains staggers from each other by ⅓-⅔ length of the curved portion; preferably, two adjacent curved portion chains staggers from each other by ½ length of the curved portion;

Preferably, there is a gap between two adjacent curved portions, and a size of the gap at the position with the smallest gap size is 0-0.5 mm;

Preferably, there is a gap between the adjacent curved section and extension end, a size of the gap is 0-0.5 mm.

In a preferred embodiment, the curved portion chains are arranged in parallel to each other, the positions of the sequent two curved portions arranged in up and down direction aligns with each other;

or, the curved portion chain is arranged in a curved line, preferably, the curved portion chain extends in a circle around a center of the tire;

preferably, the number of the circles or arcs formed by various curved portion chains or the length of the curved portion can be adjusted, thus guaranteeing that the curved portion chains are connected end to end.

In a further preferred embodiment, a connection portion is provided between at least two adjacent curved portions in the curved portion chains, so that in one same curved portion chain, at least the two adjacent curved portions are connected together.

In a preferred embodiment, the extension ends includes a half-closed circle and a transition section, the transition section is connected between the half-closed circle and the curved section, the half-closed circle is provided with an opening towards the curved section;

preferably, a radius of the half-closed circle is 0.06-0.3 mm, preferably 0.16 mm.

In a preferred embodiment, a distance between any two points on the extension end is less than or equal to 0.3 mm.

In a preferred embodiment, a distance between the sequent two curved portions is larger than 0.4 mm, preferably 0.5-1.5 mm.

In a preferred embodiment, the free space between the curved portions is filled with posts or branches, or posts or branches extend from sidewalls of the curved portion. Shapes and/or sizes of the posts and the branches can be selected such that the two adjacent curved portions are connected together by the posts and the branches.

A tire mold for manufacturing the above mentioned tire, characterized in that the tire mold includes a side plate provided with a groove structure mating with the pattern unit.

The beneficial effects of the present application are that a tire with novel sidewall pattern obtained by the above design includes at least the following advantage.

1. an obvious visual contrast with the positions not covered by the pattern region can be formed.

2. The curved section structure of the curved portion can improve rigidity of the sidewall pattern, the tire side may bulge and thus deform as it is pressed, if the deformation occurs at a position with continuous and relative long extension, the stress will concentrate at the extension, and the extension may even be broken. The curved structure of the curved section may damp and dissipate the stress of the bulged portion.

3. The discontinuous curved portions are not directly connected each other, thus avoiding stress concentration and improving lifetime of the sidewall pattern of the tire.

4. The extension ends at both ends of the curved portion can avoid breaking when stress concentration occurs at the two bulged ends.

The present application can produce the above mentioned tire by the tire mold obtained by the above mentioned design.

BRIEF DESCRIPTION OF DRAWINGS

In order to more clearly illustrate the technical solutions of the embodiments of the present application, the drawings referring to which the embodiments are described, are explained briefly as follows, and it shall be understood that the drawings only show some embodiments of the present invention and shall not be deemed as limitation on the scope of the present invention. For one skilled in the art, other relating drawings can be obtained based on these drawings without creative efforts.

Figure 1:
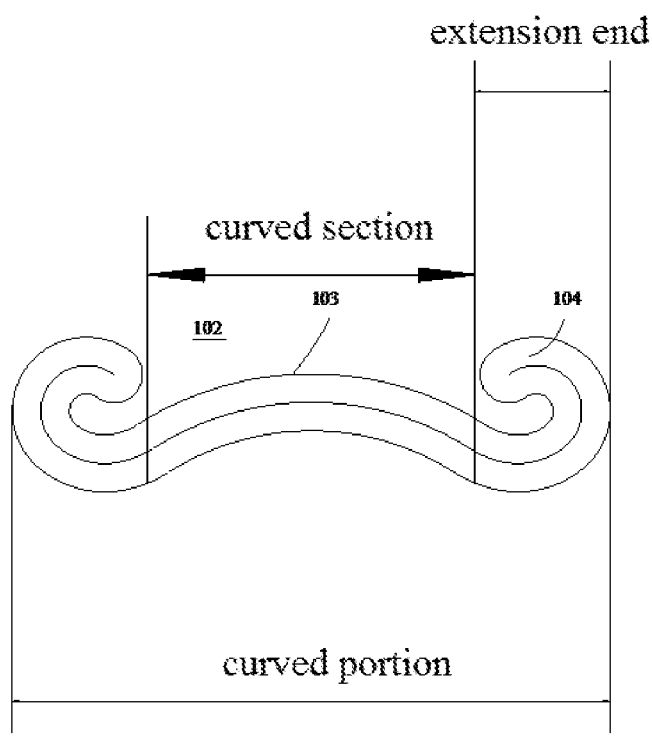
FIG. 1 is a structural illustration of a first type of pattern unit of a tire with novel sidewall pattern provided by an embodiment of the present invention.
Figure 2:
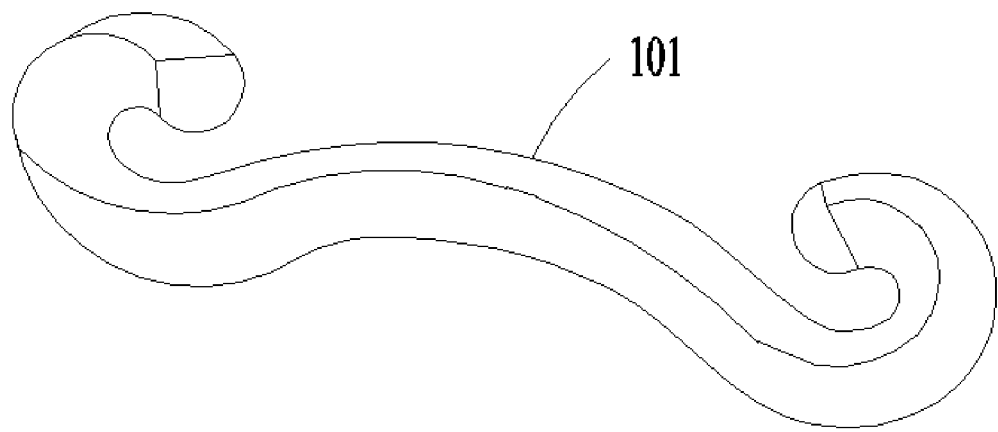
FIG. 2 is a perspective structural illustration of a first type of pattern unit of the tire with novel sidewall pattern provided by the embodiment of the present invention.

Reference numbers: pattern unit 101, curved portion 102, curved section 103, extension end 104, post 105, branch 106, circumscribed arc of curved section in the form of multi-line segment 107, circumscribed arc of extension end in the form of multi-line segment 108, connection section 109, tire mold 110, groove structure 111.

DETAILED DESCRIPTION OF THE INVENTION

In order to make the object, technical solution and advantageous of the embodiments of the present invention clear, the technical solutions of the embodiments of the present invention will be described clearly and completely in combination with the drawings in the embodiments of the present application, and obviously, the embodiments described are not all of, but parts of the embodiments of the present invention. Based on the embodiments of the present application, any other embodiments obtained by one skilled in the art without creative efforts all belong to the protective scope of the present invention. Thus, the following detailed disclosure on the embodiments of the present invention provided in the drawings is not intended to limit the scope of the present invention to be protected, but merely selected embodiments of the present invention.

In the description of the present invention, it shall be understood that the terms referring to orientations or positions are based on the orientations or positions shown in the drawings, and are just for ease of describing the present invention and simplifying the description, but do not indicate or imply that the element referred to must take the specific orientations, configured and operated in the specific orientations, so they shall not be understood as limitation on the present invention.

In the present invention, unless another specific prescription and definition, such terms as "interconnect", "connect", "secure" and the like shall be understood in a broad way, for example it can be fixedly connected, and can also be detachably connected, or integrated as one piece; it can be mechanically connected, and can also be electrically connected; it can be directly connected, and can also be indirectly connected via an intermediate; it can be internal communication between two elements, or can be interaction between the two elements. For one skilled in the art, the specific meaning of the above mentioned terms can be understood according to the detailed circumstance.

In the present invention, unless another specific prescription and definition, a first feature above or under a second feature can include directly contact between the first and second features, and can also include the situation that the first and the second features do not directly contact, but contacts via another feature therebetween. And, a first feature above, over and on a second feature includes the situations that the first feature is directly above the second feature, or is above and offset from the second feature, or just means that the first feature is at a level higher than the second feature. A first feature under, beneath and below a second feature includes the situations that the first feature is directly beneath the second feature, or is beneath and offset from the second feature, or just means that the first feature is at a level lower than the second feature.

Embodiment 1

The present embodiment provides a tire with a novel sidewall pattern, as shown in FIGS. 1-5, and 7-15.

Such a tire with novel sidewall pattern includes a tire body, a sidewall part of the tire body has a labeling region, in which multiple pattern units 101 are provided, the pattern units 101 are provided to protrude from the tire body, and the pattern unit 101 includes a curved portion 102 having a curved section 103 and extension ends 104 provided at both ends of the curved section 103.

The curved section 103 is arc shaped, and the extension ends 104 are also arc shaped, the curvature radius of the extension ends 104 is less than that of the curved section 103. Or, the curved section 103 is in the form of multi-line segments, and an angle formed by connecting the end points of the multiple line segments is 90°-180°. Or, the extension ends 104 are in the form of multi-line segments. Or, the curved section 103 and the extension ends 104 are respectively of a combined structure of multi-line segments and arc. The curvature radius of the extension ends 104 and/or its circumscribed arc is less than that of the curved section 103 and/or its circumscribed arc. A curving direction of the extension ends is different from that of the curved section.

Extension ends 104 of multiple curved portions 102 are connected with each other, thus forming a curved portion chain, and multiple curved portion chains are arranged in an interlaced way, whereby two adjacent curved portion chains are staggered relative to, or from, each other by an amount of ⅓-⅔ of the length of the curved portion, preferably by an amount of ½ of the length of the curved portion 102.

The curved portion chains can also be arranged in a non-parallel way, for example they can be arranged in a circular arc shape, thus being capable of extending in a circular ring around the center of the tire. Curved portion chains in different circles can be adjusted in terms of the number or the length of the curved portion 102, thus guaranteeing that the curved portion chains are connected end to end.

In order to facilitate in arranging the pattern, each pattern unit 101 is bilateral symmetry, and is arranged to be periodically repeated. Of course, they can also be bilateral asymmetry, and the diameters and lengths and the like of the curved section 103 and the extension ends 104 can be adjusted according to the requirements.

The curved section 103 and the extension ends 104 are respectively of arc shaped; a certain gap is formed between the curved sections 103 and the extension ends 104 of the two curved portions arranged in up and down direction, with the amount of the gap being in a range of 0-0.5 mm and the bottoms thereof being preferably tangential to each other; a certain gap is formed between extension ends 104 of the two adjacent curved portions 102, with the amount of the gap being in a range of 0-0.5 mm; or the curved portion chains are arranged in parallel, the positions of the sequent two curved portions 102 arranged in up and down direction aligns with each other. Or, the curved portion chains are arranged in arc shape, preferably the curved portion chain extends in a circular ring around the center of the tire; preferably, for the circular ring or arc constituted by different curved portion chains, the number thereof or the length of the curved portions can be adjusted, so as to guarantee that the curved portions are connected end to end. The above mentioned gap refers to a smallest distance from one position in the curved portion to another curved portion adjacent to this curved portion, or in other words, refers to a distance from this position to another position in the adjacent curved portion that is closest to this position.

The extension end 104 includes a half-closed arc and a transition section, the half-closed arc is preferably a half-closed circle, and the transition section is connected between the half-closed arc and the curved section 103, the half-closed arc is provided with an opening towards the curved section 103; or, the extension end 104 is a half-closed shape of multi-line segments.

A distance between any two points on the extension end 104 is less than or equal to 0.3 mm. Preferably, when the extension end 104 is a half-closed circle, a radius of the half-closed circle is 0.06-0.3 mm, and preferably 0.16 mm.

A length of the curved portion 102 is 1-6 mm, preferably 2-4 mm, more preferably 3 mm; and/or the height of the pattern unit 101 protruding from the tire body is 0.1-1 mm; and/or a distance between the sequent two curved portions 102 in the up and down direction is larger than 0.4 mm, preferably 0.5-1.5 mm.

An angle θ formed by a sidewall surface of the curved portion 102 and a surface perpendicular to the tire body is in a range of 5° to 30°, preferably is in a range of 15° to 25°. A distance S between the sidewall surfaces of two sides of the curved portion increases gradually from the top side to the bottom, the top can be planar or arc surface, or can be a sharp shape.

Figure 11:
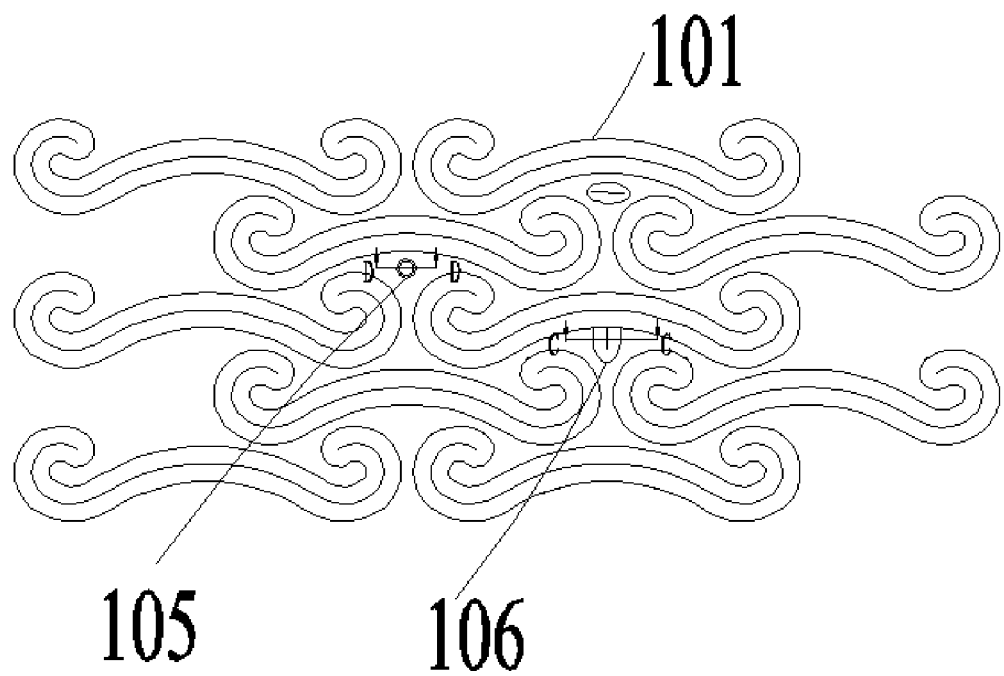
FIG. 11 is a structural illustration of a labeling region constituted by the first type of pattern units of the tire with novel sidewall pattern provided by an embodiment of the present invention.
Figure 12:
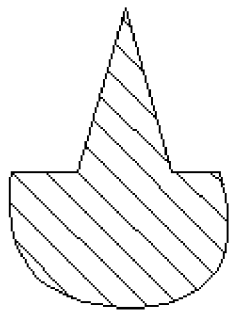
FIG. 12 is a view seen in direction C-C in FIG. 11.
Figure 13:
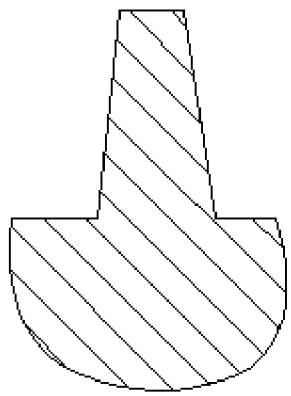
FIG. 13 is a view seen in direction D-D in FIG. 11.

The sidewall of the curved portion 102 is provided with branches; or the free spaces between the curved portions 102 can be filled with posts 105 or branches 106, as shown in FIGS. 11-13. An angle formed by the posts or the branches and the surface perpendicular to the tire body is in a range of 5° to 30°, preferably in a range of 15° to 25°, the posts can be cone or pyramid, and so on.

In a structure filled with the posts 105 or branches 106, there are also gaps between the posts 105 or branches 106 and at least one adjacent curved portion 102, the amount of the gap is also set in a range of 0-0.5 mm. In other words, if the gap between the adjacent curved portions is larger than 0.5 mm, the amount of the actual gap formed can still be controlled within the range of 0-0.5 mm by filling posts 105 or branches 106 in this gap.

Figure 3:
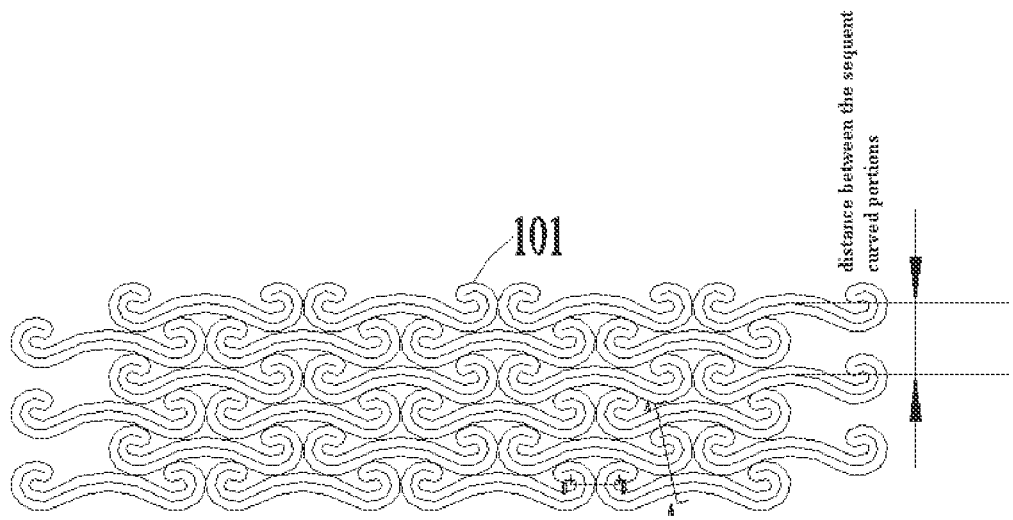
FIG. 3 is a structural illustration of a labeling region constituted by the first type of pattern units of the tire with novel sidewall pattern provided by the embodiment of the present invention.

FIGS. 1 and 3 show a first type of pattern unit 101, the curved portion 102, which constitutes the pattern unit 101, includes an arc shaped curved section 103 and extension ends 104 provided at both ends of the curved section 103, each extension end 104 includes a half-closed circle and a transition section, the transition section is connected between the half-closed circle and the curved section 103, and the half-closed circle is provided with an opening facing towards the curved section 103. The extension ends 104 of multiple curved portions 102 are connected each other, thus forming a curved portion chain in a straight line. A length of the curved portion 102 is 1-6 mm, preferably 2-4 mm, more preferably 3 mm. FIG. 3 shows a curved portion chain formed by connecting the extension ends 104 of multiple curved portions 102, and the multiple curved portion chains are arranged in a staggered way, whereby the two adjacent curved portion chains are staggered relative to, or from, each other by ½ of the length of the curved portion 102; and a distance between the sequent two curved portions 102 arranged in an up and down direction is 0.5-1.5 mm.

Figure 4:
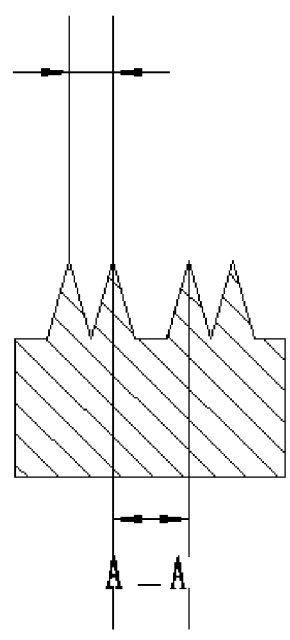
FIG. 4 is a view seen in direction A-A in FIG. 3.

FIG. 4 shows that a certain gap is formed between the extension ends 104 and curved sections 103 of two adjacent curved portions 102, with the amount of the gap is less or equal to 0.5 mm, preferably the bottom thereof being tangential to each other. At the same time, the radius of the half-closed circle of the extension ends 104 is 0.06-0.3 mm, and the one shown in the drawing is 0.16 mm.

Figure 5:
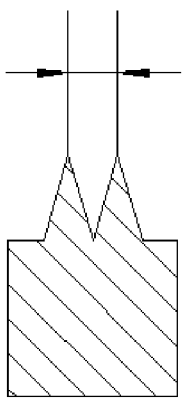
FIG. 5 is a view seen in direction B-B in FIG. 3.

FIG. 5 shows a certain gap between the curved sections 103 of two adjacent curved portions 102, with the amount of the gap being less than or equal to 0.5 mm.

Figure 7:
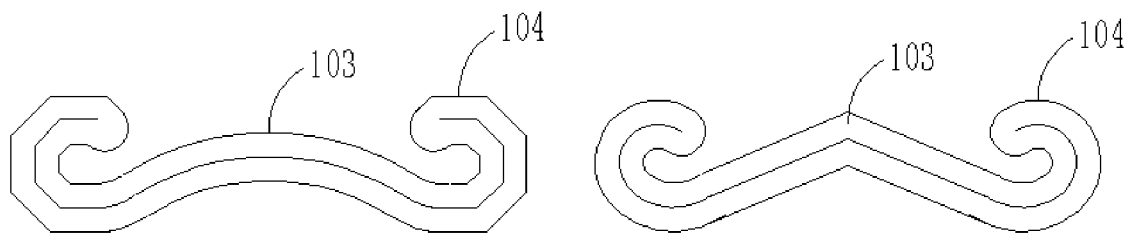
FIG. 7 is a structural illustration of second and third types of pattern units of the tire with novel sidewall pattern provided by the embodiment of the present invention.

FIG. 7 shows the second and the third types of the pattern units 101, the curved portion 102, which constitutes the pattern unit 101, includes a curved section 103 in the form of multi line segments and/or a curved section 103 in arc shape, and extension ends 104 provided at both ends of the curved section 103, each extension end 104 includes half-closed circle or multi-line segments, and a transition section.

Figure 8:
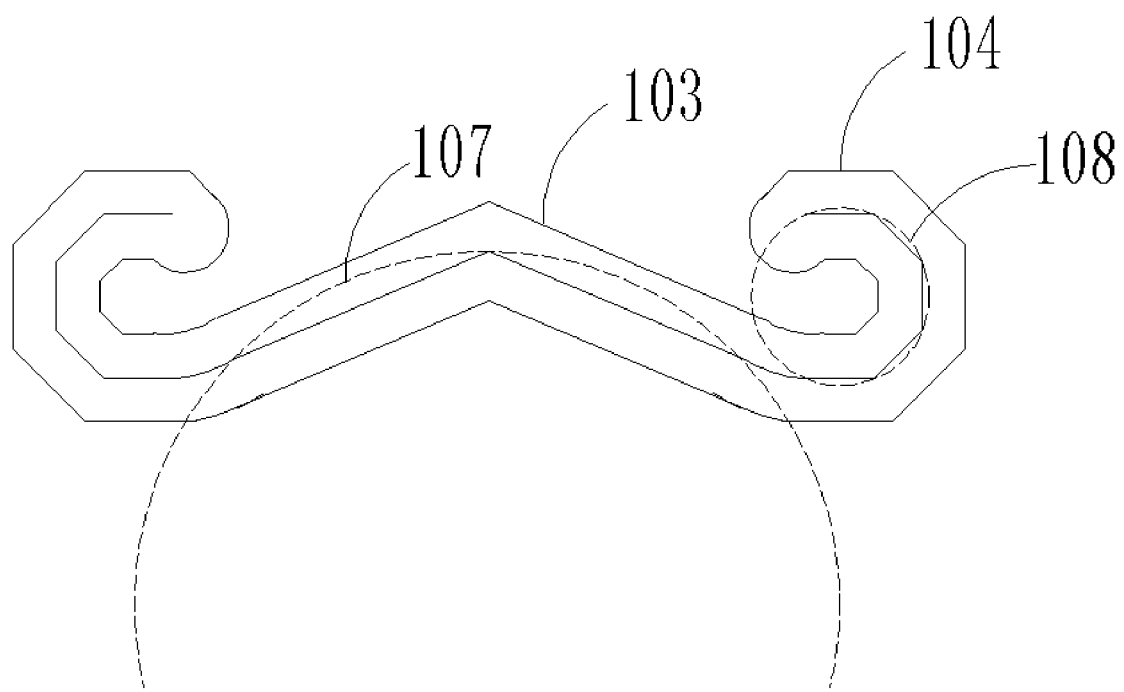
FIG. 8 is a structural illustration of a fourth type of pattern unit of the tire with novel sidewall pattern provided by the embodiment of the present invention.
Figure 9:
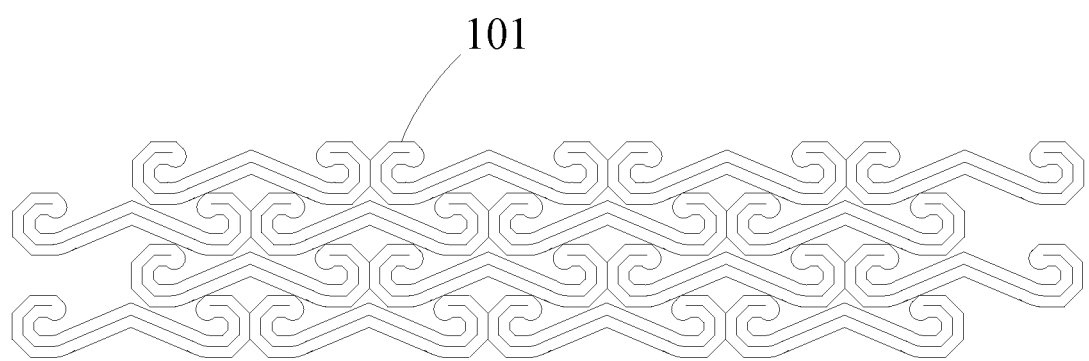
FIG. 9 is a structural illustration of a labeling region constituted by the fourth type of pattern units of the tire with novel sidewall pattern provided by the embodiment of the present invention.
Figure 10:
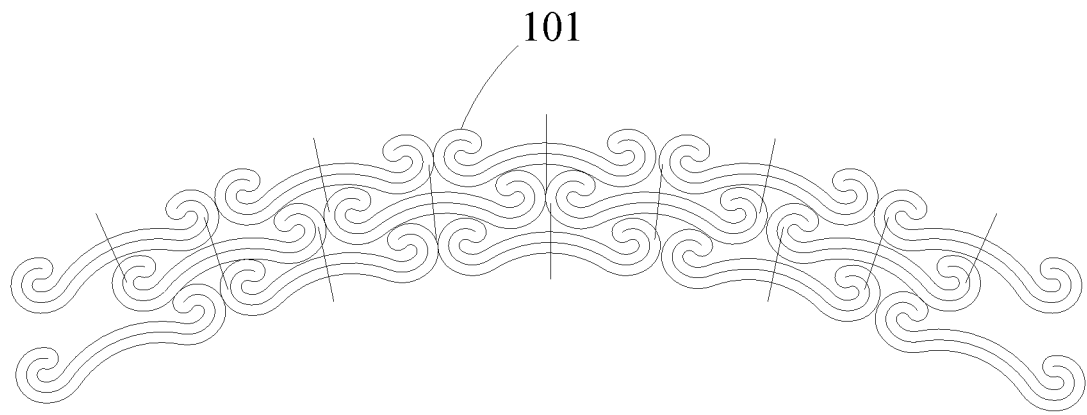
FIG. 10 is a structural illustration of another labeling region constituted by the first type of pattern units of the tire with novel sidewall pattern provided by the embodiment of the present invention.

FIGS. 8 and 9 show the fourth type of the pattern unit 101, a curved portion 102, which constitutes the pattern unit 101, includes a curved section 103 in the form of multi-line segments and extension ends 104 provided at both ends of the curved section 103, each extension end 104 is also in the form of multi-line segments. Meanwhile, also shown are a circumscribed arc 108 of the curved section in the form of multi-line segments and a circumscribed arc 109 of the extension end in the form of multi-line segments, and curvature radius of the circumscribed arc 109 of the extension end in the form of multi-line segments is less than that of the circumscribed arc 108 of the curved section in the form of multi-line segments. For the same reasons, in the pattern unit 101 shown in FIG. 7 or in other forms, curvature radius of the circumscribed arc 109 of the extension end 104 in the form of multi-line segments or of the extension end 104 in arc shape is less than that of the circumscribed arc 108 of the curved section in the form of multi-line segments or of the curved section 103 in arc shape.

In FIG. 11, a gap between the adjacent curved portions 102 can be adjusted according to requirement, and a free space between the adjacent curved portions 102 can be provided with posts or branches. An angle formed by the posts or the branches and the surface perpendicular to the tire body is in a range of 5° to 30°, preferably in a range of 15° to 25°, as shown in FIGS. 12 and 13. Further, the shape and/or size of the posts or branches can be selected according to actual requirement, for example, the size of the posts or branches can be selected as being capable of connecting the two adjacent curved portions together.

Figure 14:
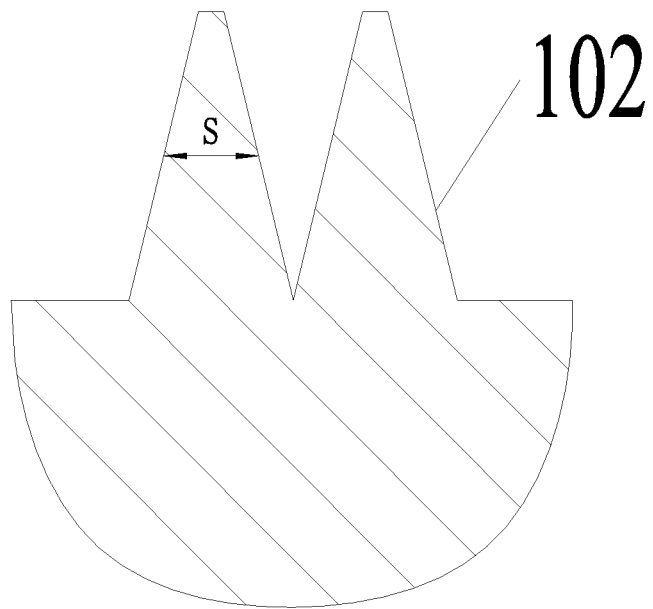
FIG. 14 is a structural illustration of a top of one type of curved portion of the tire with novel sidewall pattern provided by the embodiment of the present invention.
Figure 15:
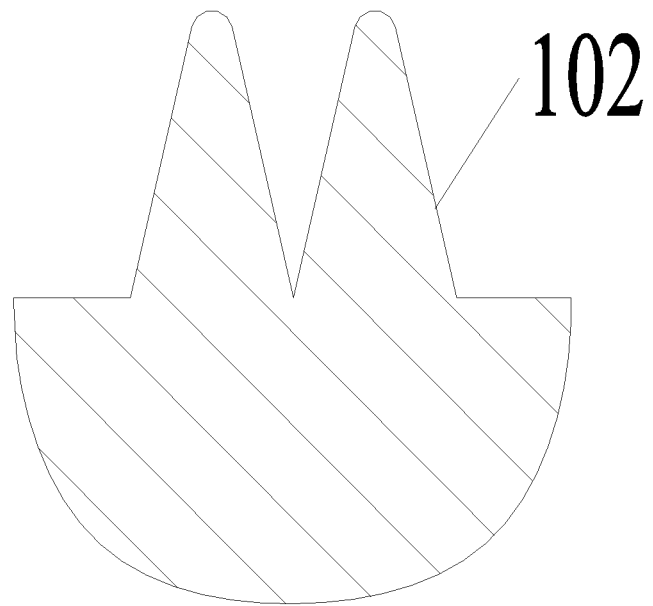
FIG. 15 is a structural illustration of a top of another type of curved portion of the tire with novel sidewall pattern provided by the embodiment of the present invention.

FIGS. 14, 15 show that a distance S between the sidewall surfaces of two sides of the curved portion 102 increases gradually from the top side to the bottom, the top can be planar or arc surface, or can be a sharp shape.

Figure 16:
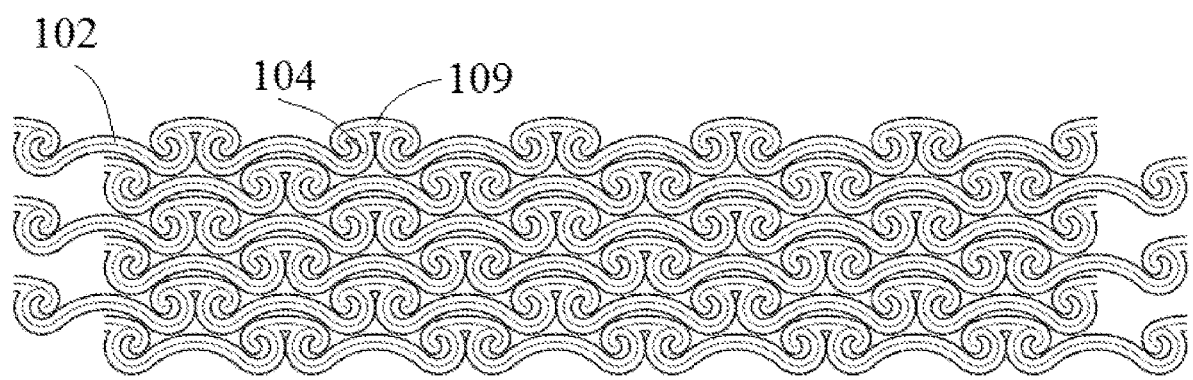
FIG. 16 is a structural illustration of sixth and third types of pattern units of the tire with novel sidewall pattern provided by the embodiment of the present invention.

FIG. 16 shows a sixth type of pattern unit 101, wherein a connection section 109 is provided between the extension ends 104 of two adjacent curved portions 102 in a curved portion chain. The connection section 109 may be in arc shape as shown in FIG. 16, and may also be straight line. Thus, in the structure shown in FIG. 16, the pattern unit 101 is formed as a curved portion chain extending continuously.

In the pattern region of the tire sidewall, incident light onto protrudes formed in the pattern region (labeling region) is reflected onto the adjacent sidewall surfaces. Since the light is reflected back and forth between the sidewalls, the light is weakened. Therefore, essentially no light is reflected outside the pattern region, so that the pattern region looks black, and in comparison, the other regions (regions with letters and the rest regions of the tire sidewall) looks white. Therefore, a contrast is formed between the pattern region and the other regions. This improves contrast degree between the appearance of the pattern region and the regions not covered by the pattern.

Preferably, in the above mentioned curved portion 102, the average width of the curved section 103, the extension ends 104 and/or the connection section 109 is in the range of 0.03-3 mm, preferably in the range of 0.03-0.5 mm.

The tire provided by the present embodiment at least has the following advantageous over the tire of prior art.

1. an obvious visual contrast with the positions not covered by the pattern region can be formed.

2. the structure of the curved section 103 of the curved portion 102 can improve rigidity of the tire side pattern, the tire side may bulge and thus deform as it is pressed, if the deformation occurs at a position with continuous and relative long extension, the stress will concentrate at the extension, and the extension may even be broken. The curved structure of the curved section 103 may damp and dissipate the stress of the bulged portion.

3. The discontinuous curved portions 102 are not directly connected each other, thus avoiding stress concentration and improving lifetime of the tire side pattern of the tire.

4. The extension ends 104 at both ends of the curved portion 102 can avoid breaking when stress concentration occurs at the two bulged ends.

Embodiment 2

Figure 6:
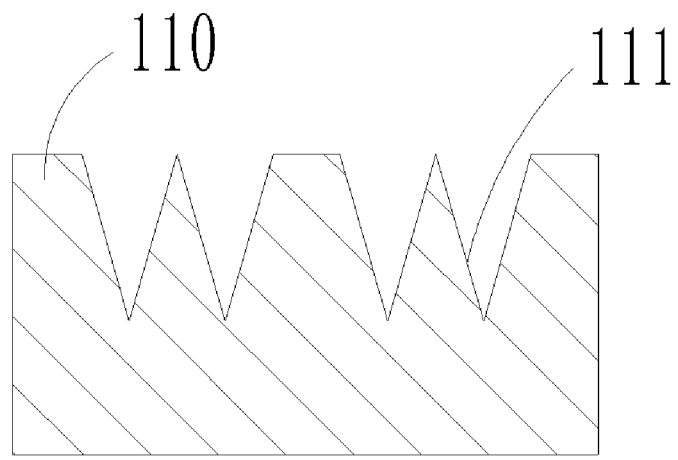
FIG. 6 is a structural illustration of a tire mold for producing the tire pattern in FIG. 4.

The present embodiment provides a tire mold 110 for the tire of embodiment 1, as shown in FIG. 6, the tire mold 110 includes a side plate, on which groove structure 111 mating with the pattern unit 101 is provided.

The sidewall of the vulcanized tire can be formed with a designed protruding structure by the labeling region of the mold. The designed protruding structure forms a pattern region or letter region of the tire sidewall. The letter region shows letters, such as "ABCDEFGH" shown in a smooth surface.

The designed protruding structure can be in the pattern region, or can surround the letter region, or can be separately on the letter region. The pattern region is preferably provided at a position closer to radial outside of the tire. The groove structure 111 of the mold can be formed by using laser engraving.

The above disclosures are merely preferred embodiments of the present invention, and do not tend to limit the present invention; for one skilled in the art, the present invention can undergo various modifications and changes. Any modifications, equivalences, improvements and the like within the sprit and principle of the present invention are included in the protective scope of the present invention.

What is claimed is:

1. A tire with novel sidewall pattern, the tire comprising:
a tire body, a sidewall of the tire body having a labeling region, in which multiple pattern units are provided, wherein:
the multiple pattern units are provided to protrude out from the tire body, and each of the multiple pattern units includes a curved portion having a curved section and extension ends provided at both ends of a respective one of the curved section to which they belong;
the extension ends of multiple curved portions are connected so as to form a curved portion chain, and multiple curved portion chains are arranged in parallel with extension ends of the curved portions of one curved portion chain aligning with curved sections of the curved portions of an adjacent curved portion chain in an interlaced way such that two adjacent curved portion chains are staggered relative to each other by ⅓-⅔ of the length of the curved portion;
the curved section and the extension ends are both in the form of an arc shape, a certain gap is formed between adjacent curved sections and their extension ends;
a certain gap is formed between two adjacent curved portions;
a length of the curved portion is 1-6 mm, and/or a height of a pattern unit protruding from the tire body is 0.1-1 mm;
an angle θ formed by a sidewall surface of the curved portion and a surface perpendicular to the tire body is in a range of 5° to 30°;
a distance S between sidewall surfaces of two sides of the curved portion increases gradually from a top side to a bottom side, the top side can be a planar or arc surface, or can be a sharp shape; and a curvature radius of the extension ends and/or a circumscribed arc thereof is less than that of the curved section and/or a circumscribed arc thereof.

2. The tire with novel sidewall pattern according to claim 1, wherein positions of two sequent curved portions arranged in an up and down direction align with each other.

3. The tire with novel sidewall pattern according to claim 1, wherein a distance between any two points on an extension end is less than or equal to 0.3 mm.

4. The tire with novel sidewall pattern according to claim 1, wherein a free space between the curved portions is filled with posts or branches.

5. The tire with novel sidewall pattern according to claim 1, wherein a curvature radius of the circumscribed arc of the extension ends in the form of multi-line segments or a curvature radius of the extension ends in the form of the arc shape is less than that of the circumscribed arc of the curved section in the form of multi-line segments or that of the curved section in the form of the arc shape.

6. The tire with novel sidewall pattern according to claim 1, wherein a curving direction of an extension end is different from the curving direction of the curved section.

7. The tire with novel sidewall pattern according to claim 1, wherein the length of the curved portion is 2-4 mm.

8. The tire with novel sidewall pattern according to claim 7, wherein the length of the curved portion is 3 mm.

9. The tire with novel sidewall pattern according to claim 1, wherein each of the multiple pattern units has bilateral symmetry, and is periodically repeated.

10. The tire with novel sidewall pattern according to claim 1, wherein each of the multiple pattern units has bilateral asymmetry.

11. The tire with novel sidewall pattern according to claim 1, wherein an angle formed by connecting end points of multiple line segments of the curved portion is 90°-180°.

12. The tire with novel sidewall pattern according to claim 1, wherein two adjacent curved portion chains are staggered relative to each other by ½ of the length of the curved portion.

13. The tire with novel sidewall pattern according to claim 1, wherein an amount of the gap between the two adjacent curved portions at the position where the gap is minimum is 0-0.5 mm.

14. The tire with novel sidewall pattern according to claim 1, wherein an amount of the gap between the adjacent curved sections and the extension at the position where the gap is minimum is 0-0.5 mm.

15. The tire with novel sidewall pattern according to claim 1, wherein the curved portion chain is arranged in a curved line.

16. The tire with novel sidewall pattern according to claim 1, wherein the curved portion chain extends in a circular ring around a center of the tire.

17. The tire with novel sidewall pattern according to claim 1, wherein a distance between two sequent curved portions is 0.5-1.5 mm.

18. The tire with novel sidewall pattern according to claim 1, wherein posts or branches are provided to extend from a sidewall of the curved portion.

19. A tire with novel sidewall pattern, the tire comprising:
a tire body, a sidewall of the tire body having a labeling region, in which multiple pattern units are provided, wherein:
the multiple pattern units are provided to protrude out from the tire body, and each of the multiple pattern units includes a curved portion having a curved section and extension ends provided at both ends of a respective one of the curved section to which they belong;
the extension ends of multiple curved portions are connected so as to form a curved portion chain, and multiple curved portion chains are arranged in parallel with extension ends of the curved portions of one curved portion chain aligning with curved sections of the curved portions of an adjacent curved portion chain in an interlaced way such that two adjacent curved portion chains are staggered relative to each other by ⅓-⅔ of the length of the curved portion;
the curved section and the extension ends are both in the form of an arc shape, a certain gap is formed between adjacent curved sections and their extension ends;
a certain gap is formed between two adjacent curved portions;
a length of the curved portion is 1-6 mm; and/or a height of a pattern unit protruding from the tire body is 0.1-1 mm;
an angle θ formed by a sidewall surface of the curved portion and a surface perpendicular to the tire body is in a range of 5° to 30°;
a distance S between sidewall surfaces of two sides of the curved portion increases gradually from a top side to a bottom side, the top side can be a planar or arc surface, or can be a sharp shape; and
a transition section is connected between a half-closed circle and the curved section, wherein the half-closed circle is provided with an opening facing towards the curved section.

20. The tire with novel sidewall pattern according to claim 19, wherein the radius of the half-closed circle is 0.06-0.3 mm.

21. The tire with novel sidewall pattern according to claim 19, wherein the radius of the half-closed circle is 0.16 mm.

22. A tire mould for manufacturing the tire according to claim 1, wherein the tire mould includes a side plate provided with a groove structure configured to form the multiple pattern units.

* * * * *